United States Patent [19]

Versteegh

[11] Patent Number: 4,861,608

[45] Date of Patent: Aug. 29, 1989

[54] METHOD OF SEPARATING TRUB FROM HOT WORT

[75] Inventor: Christiaan W. Versteegh, Delft, Netherlands

[73] Assignee: Heineken Technisch Beheer B.V., Amsterdam, Netherlands

[21] Appl. No.: 103,516

[22] Filed: Oct. 1, 1987

[30] Foreign Application Priority Data

Oct. 2, 1986 [NL] Netherlands ............... 8602488

[51] Int. Cl.$^4$ ............................................. C12C 7/14
[52] U.S. Cl. .................................. 426/489; 99/278; 210/521; 426/495
[58] Field of Search ............... 426/489, 495; 210/801, 210/521; 99/278

[56] References Cited

U.S. PATENT DOCUMENTS

| | | | |
|---|---|---|---|
| 2,530,594 | 11/1950 | Benedict | 426/495 |
| 3,962,478 | 6/1976 | Hohlbein et al. | 426/495 |
| 4,197,321 | 4/1980 | Chyba et al. | 426/489 |
| 4,315,038 | 2/1982 | Townsley et al. | 426/489 |

*Primary Examiner*—George Yeung
*Attorney, Agent, or Firm*—Gottlieb, Rackman & Reisman

[57] ABSTRACT

A method of separating trub from hot wort, in which unpurified hot wort is supplied to a settling device and after the settling process purified wort is withdrawn at a level above the bottom of the settling device, and trub is withdrawn at a level at or near the bottom of the settling device. According to the invention, a gravity-induced circulation is created in the settling device by withdrawing heat from one part of the surface of the wort liquid and screening off the other part of the surface against heat loss. A column of liquid topped by said one part is kept separate from a column of liquid topped by the other part throughout its entire height, except for a narrow upper gap and a bottom gap. The method can be carried out by means of a separator comprising a container with top, bottom and sidewalls and filling and drain means in which a substantially vertically extending partition wall member is disposed in the container at least throughout the major part of the height thereof to separate a first space within said container from a second space within said container, the container being partially closed by the top wall, which extends over said one space and leaves the top of the other space free, the gaps being defined between said partition wall member and said top and bottom walls, through which gaps the spaces are in communication with each other.

6 Claims, 1 Drawing Sheet

METHOD OF SEPARATING TRUB FROM HOT WORT

This invention relates to a method of separating trub from hot wort, in which unpurified, hot wort is supplied to a settling device and after the settling process purified wort is withdrawn at a level above the bottom of the settling device and trub at a level at or near the bottom of the settling device. The invention further relates to apparatus for carrying out such a method.

A similar method and apparatus for separating trub from hot wort are described in German Offenlegungsschrift No. 33 24 818. In it, the wort to be purified is introduced tangentially into a so-called whirlpool at a given velocity. The trub will settle and owing to the rotating flow in the separator be collected in a conical form in the middle and on the bottom. Rotating the wort to be purified means that energy must be supplied to it, while, in discharging the purified wort, it should be ensured that the trub cone is not disturbed in the case of a discontinuous process. When the process is carried out continuously, the rotary flow must not be affected by the discharge of both purified wort and trub.

It is an object of the present invention to provide a method of separating trub from hot wort that is of simpler performance.

According to the invention, this is achieved by creating a natural circulation in the settling device by withdrawing heat from one part of the surface of the wort liquid and screening off the other part of said surface against heat loss, a column of liquid topped by said one part being kept separate from a column of liquid topped by the other part throughout its entire height, except for a narrow upper edge region and a bottom edge region.

Owing to the above measures, a gravity-induced circulation is generated, utilizing the energy present in the hot wort. As heat is given up at the non-covered liquid surface, differences in density are created between the two columns of liquid. The heavier, cooler wort starts to move downwards in the column of liquid topped by the non-screened liquid surface, while the lighter, hotter wort in the other column of liquid starts to move upwardly and, via a gap at the narrow upper edge region reaches the non-covered liquid surface, whereafter cooling by evaporation takes place, which maintains the circulation. The trub will settle to the bottom, where it will be swept together by the streaming wort. It has surprisingly been found that, in the process according to the invention, considerably larger flocs are formed than in a whirlpool, resulting in faster settling and hence purification.

In order to optimize the effectiveness of the stream, it is preferable, and in accordance with a further embodiment of the invention, that the area of the surface at the top of the non-covered column of liquid is large relatively to the horizontal cross-sectional area of that column over the major part of its height in its mid-region. It is thus possible to provide an optimum area of evaporation, while the other column of liquid can settle over a relatively large surface area, by virtue of which the trub, too is swept together in an effective manner.

Depending on the size of the evaporation surface and the temperature of the wort, compared with that of the ambient atmosphere, cooling can be effected either naturally, by evaporation, or in a forced manner.

An efficient treatment of the wort to be purified is realized, in accordance with a further embodiment of the invention, if, during the settling process, purified wort and/or trub is discharged and/or wort to be purified is supplied, which supply and discharge can be effected continuously.

The invention also relates to an apparatus for carrying out the separation method according to the invention, which apparatus comprises a container with top, bottom and sidewalls and filling and drain means. In accordance with the invention the apparatus is characterized by a substantially vertically extending partition wall member disposed in the container at least throughout the major part of the height thereof to separate a first space within said container from a second space within said container, the container being partially closed by the top wall, which extends over said one space and leaves the top of the other space free, there being respective openings or gaps between said partition wall member and said top and bottom walls through which the spaces are in communication with each other. By virtue of these measures, an effectively operating separator is realized in a relatively inexpensive way.

Preferably, and in accordance with a further embodiment of the invention, the free edge of the top wall overlaps the upper edge of the partition wall member, which makes for a good separation between covered and non-covered liquid surface. In order that, in that arrangement, when the liquid level is lowered in the container, the free liquid surface should be increased as little as possible, it is preferable, and in accordance with a further embodiment of the invention that the top wall of the container slopes upwardly in the direction of the non-covered space.

Another or further possibility of adaptation to different liquid levels in the container can be realized by a further embodiment of the apparatus according to the invention, in which the positions of the top wall and/or the partition wall member in the container are adjustable. This adjustability can be implemented by mechanical means, for example, but it is also possible for the top wall to be freely displaceable in a vertical direction over a predetermined distance, there being provided guide means for keeping said top wall in position within the container in a horizontal direction. In that embodiment, it is possible for the top wall to float on the liquid it covers. Naturally, in such an arrangement it is necessary for the top wall to have sufficient buoyancy. To ensure optimum coverage, the buoyancy of the top wall should preferably be selected so that the free liquid surface does not substantially extend further than the partition wall member.

An increased evaporation surface area and an optimum trub settling space and trub collection can be promoted in accordance with a further embodiment of the present invention, in which the partition wall member greatly reduces the horizontal cross-section of the non-covered space in the mid-region of the latter, subsequently extends substantially vertically over a major part of the height of the container, and in a bottom region of the container together with the bottom wall and/or sidewall of the container forms a tapered slit-shaped gap or nozzle.

The separator can be realized in a simple manner if, in accordance with a further embodiment of the invention, the container has a rectangular cross-sectional configuration and the partition wall member, at least the vertical part thereof, extends parallel to and is spaced relatively closely from, one of the sidewalls of the container. In this way, the separation process can actually be carried out using a plate in a rectangular container. Naturally, it is also possible for the container to have a circular cross-sectional configuration and for the partition wall member, at least the vertical part thereof, to extend parallel to and spaced relatively closely from, the cylindrical wall of the container, while further all sorts of other forms and combinations of forms are possible.

The separation method and apparatus according to the invention will now be described in more detail hereinafter with reference to some embodiments illustrated, by way of example, in the accompanying drawings. In said drawings, FIG. 1 is a cross-sectional view, showing a first embodiment of the separator according to the present invention;

Figure 1:
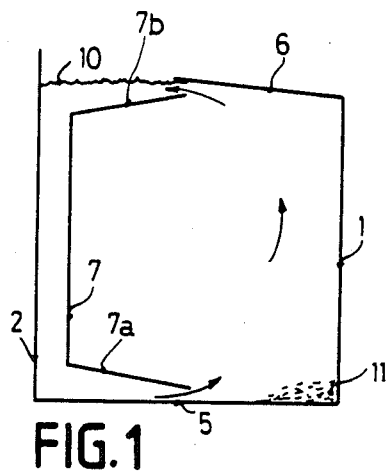
Figure 2:
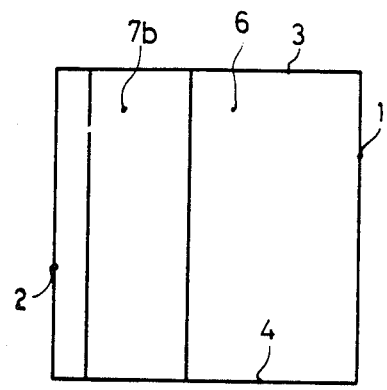
FIG. 2 shows a top plan view of the showing of FIG. 1.

FIG. 1 shows a separator with a rectangular cross-sectional configuration and having sidewalls 1-4, a bottom wall 5 and a top wall 6. The top wall 6 slopes upwardly from sidewall 1 in the direction of sidewall 2, which is higher than sidewall 1. Top wall 6 has a width in the order of half that of bottom wall 5, and side edges of top wall 6 are sealingly connected to the top edges of sidewalls 1, 3 and 4. Disposed within the separator, which thus is partly closed at the top, is a partition wall member 7, the side edges of which connect sealingly to the sidewalls 3 and 4. Wall member 7 extends throughout the major part of its height parallel to, and is spaced closely from, the sidewall 2. The bottom edge region 7a and the top edge region 7b of wall member 7 are bent away from sidewall 2. The top edge region 7b is dimensioned so that its free terminal edge extends beyond the free terminal edge of top wall 6, so that these parts overlap. Both the lower edge region 7a and the top edge region 7b enclose a relatively sharp angle with a horizontal plane, with the bottom edge region 7a extending in closely spaced relationship to, and in the direction of, bottom wall 5, the arrangement being such that a slit-shaped gap or nozzle is formed at the free forward edge of the bottom edge region 7a.

To purify a quantity of wort, it is introduced into the separator, which is filled to such an extent as to form the liquid surface 10. By cooling by means of evaporation at the liquid surface 10, the wort on the left-hand side of wall member 7, as viewed in FIG. 1, becomes heavier than the wort on the right-hand side of that wall member. As a result, a circulation is initiated in the separator in the direction of the arrows given in FIG. 1. This circulation is maintained because continuously hot wort is supplied to the evaporation liquid surface 10 via the aperture or gap between the top wall 6 and the top edge region 7b of wall member 7. During this circulation process the trub will settle and be "swept together" by the stream from the slit-shaped nozzle between the bottom edge region 7a and the bottom wall 5, as indicated by reference numeral 11 in FIG. 1. After clarification of the liquid, the purified wort can be removed by being drained at a level above the settled and swept-together trub, which in turn, can be removed through a drain hole in bottom wall 5.

The above process can be carried out continuously or semi-continuously by draining purified wort and trub and supplying wort to be purified, in a suitable manner. The sloping top wall has the advantage that in the case of fluctuations in liquid level, in particular when the liquid level decreases, the size of the exposed liquid surface will fluctuate to a minor extent only, in particular it will not be too quick to extend throughout the entire surface of the separator. Naturally, it is also possible for the top wall 6 and the top edge region 7a, for example together with a portion of the wall member 7 to be constructed so as to be vertically adjustable to suit different liquid levels.

Figure 3:
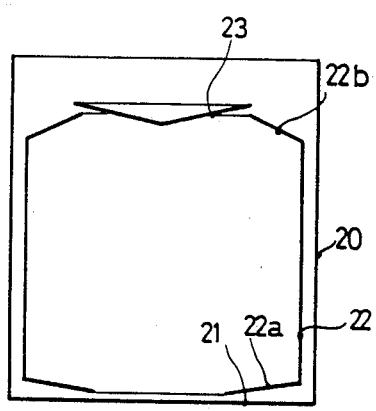
FIG. 3 is a cross-sectional view, showing a second embodiment.

FIG. 3 shows a separator with a circular cross-sectional configuration and having a cylindrical sidewall 20 and a bottom wall 21. Similarly to FIG. 1, a partition wall member 22, now cylindrical in shape, is disposed within sidewall 20, which wall member 22 has an inwardly bent top edge region 22b and an inwardly bent bottom edge region 22a. The free terminal edge of the top edge region 22b is overlapped by the free terminal edge of a top wall 23 of inverted conical configuration. The operation of this separator is similar to that of FIG. 1, although in the embodiment of FIG. 3, the column of colder wort extends around the entire separator, so that, in this embodiment, some heat can be dissipated via the sidewall without any objections. As a result of the circular configuration of the separator, the trub will be swept together in the form of a cone in the middle of the bottom wall 21.

Figure 4:
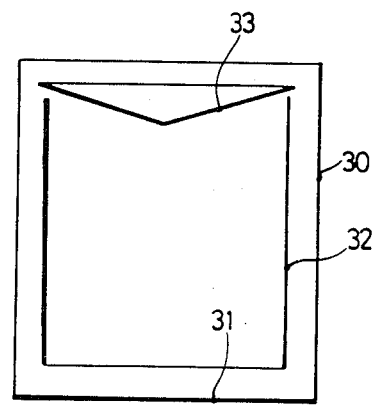
FIG. 4 is a cross-sectional view of a third embodiment.

FIG. 4 is similar to FIG. 3 and shows a separator with a circular cross-sectional configuration with a cylindrical sidewall 30, a circular bottom wall 31, a cylindrical partition wall member 32 and a top wall 33 of inverted conical shape. In contrast to FIG. 3, wall member 32 is now fully cylindrical, i.e., it does not have inwardly bent top and bottom edge regions. In order to realize the preferred overlap, the diameter of top wall 33 has been selected somewhat larger than that of wall member 32. Furthermore, the annular space between sidewall 30 and partition wall member 32 has been selected somewhat larger than in the embodiment of FIG. 3 to keep the free cooling surface large enough.

As stated before, the sloping top wall has advantages in the case of fluctuations in liquid level, while there may also be provided a vertically adjustable construction at the top wall. In most cases these will be mechanical adjusting means. It is equally possible, however, for the top wall to be constructed so that it floats on the liquid. In that embodiment, means should be provided to keep the top wall in position in a horizontal direction. As a further refinement for keeping the slit opening or gap between the bottom wall and the partition wall member constant, these two parts may be coupled so that a floating top wall will cause a portion of the partition wall member to perform a downward movement when the liquid level is lowered. The realization of such constructions will readily occur to the skilled artisan, so that these constructions will not be described in any further detail herein.

Figure 5:
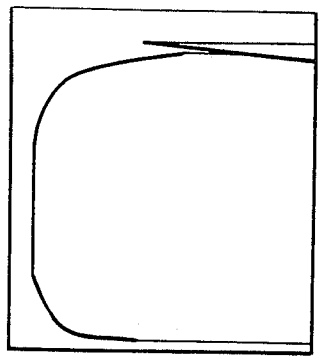
FIG. 5 is a cross-sectional view of a fourth embodiment.
Figure 6:
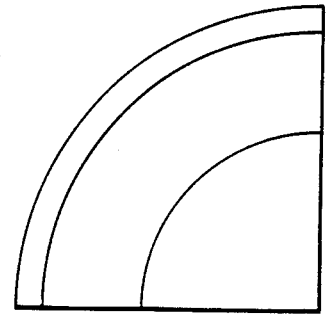
FIG. 6 is top plan view view of the showing of FIG. 5.

FIGS. 5 and 6 show a hybrid of the embodiments of FIGS. 1, 2 and 3 or 4. In this construction, if it is sector-shaped as shown in FIG. 6, the trub can again be swept together in a corner, while an arrangement of an overall circular configuration, with a circumferential cooler column of liquid, can be realized by placing four of such sector-shaped separator constructions in juxtaposition to each other. In FIG. 5, the partition wall member 40 has a more smoothly configured profile at its bottom region, which can promote settling and sweeping together of the trub.

Naturally, many modifications and variants are possible without departing from the scope of the invention. Thus all sorts of configurations different from those shown are possible, in which connection it is conceivable for the liquid surface to extend outwardly from the sidewall of the separator and for the bottom wall to have a conical or funnel-shaped configuration. Also, means may be provided for forced cooling of the wort at the liquid surface. Furthermore, a sidewall may be curved rather than straight, as a result of which the channel formed together with the partition wall member is configured to produce smoother circulation. The partition wall member proper may be formed as a thicker panel, rather than as a plate, for example, when it is preferred to provide an insulating layer between the colder and the warmer wort.

What I claim is:

1. In a method of separating trub from hot wort liquid in a settling device including a container having a bottom wall, side walls, a top, and an upstanding partition wall dividing the interior of the container into a first and a second space, said partition wall having an upper end in the region of the top of said container and a lower end separated from said bottom wall by a first gap establishing communication between said first and second spaces near the bottom of the container, which method includes the steps of introducing unpurified hot wort liquid and trub into said container so as to fill the same up to a level below the top of the container, with trub settling out of said hot wort liquid in said container, withdrawing purified wort from said container, and withdrawing settled trub from said container at a level near or at said bottom wall;

wherein the improvement comprises the steps of:
 (a) providing a top wall member in overlying relation to said second space and said upper end of said partition wall, with said upper end of the latter being spaced from the underside of said top wall member to define thereat a second gap establishing communication between said first and second spaces adjacent the top of said container; and
 (b) withdrawing heat from the uncovered surface of a first column of the wort liquid disposed in said first space while, by means of said top wall member, screening the surface of a second column of the wort liquid disposed in said second space against heat loss, thereby to cause the wort liquid in said first space to become heavier than the wort liquid in said second space and to effect a consequent gravity-induced circulation of the wort liquid from said first space through said first gap into said second space and from second space through said second gap into said first space;
 (c) said gravity-induced circulation of the wort liquid causing settled trub in said second space to be swept together on said bottom wall of said container.

2. A method as claimed in claim 1, wherein the area of the surface of said first column of wort liquid not covered by said top wall member is larger than the horizontal cross-sectional area of that column at the mid-region of said partition wall.

3. A method as claimed in claim 1 or 2, wherein heat is withdrawn from the uncovered surface of only said first column of wort liquid by evaporation.

4. A method as claimed in claim 1 or 2, wherein heat is withdrawn from said first column of wort liquid in a forced manner.

5. A method as claimed in claim 1 or 2, wherein during the settling process purified wort or settled trub is discharged from said container and unpurified hot wort is supplied to said container.

6. A method as claimed in claim 1 or 2, wherein during the settling process purified wort or settled trub is continuously discharged from said container and unpurified hot wort is continuously supplied to said container.

* * * * *